March 8, 1949.　　　　S. W. NICHOLSON　　　　2,463,900
AIR MOTOR OF THE EXPANSIBLE CHAMBER
COLLAPSIBLE WALL TYPE Filed Feb. 26, 1945　　　　　　　　　　　　3 Sheets-Sheet 1

INVENTOR.
Stanley W. Nicholson

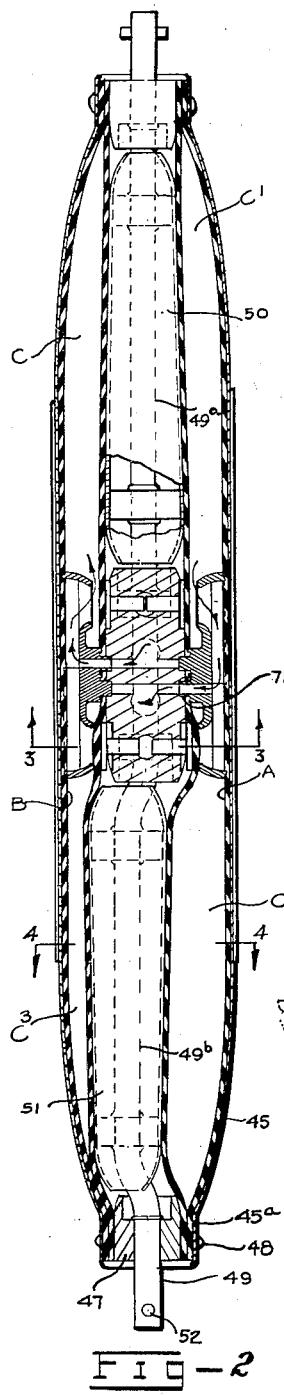

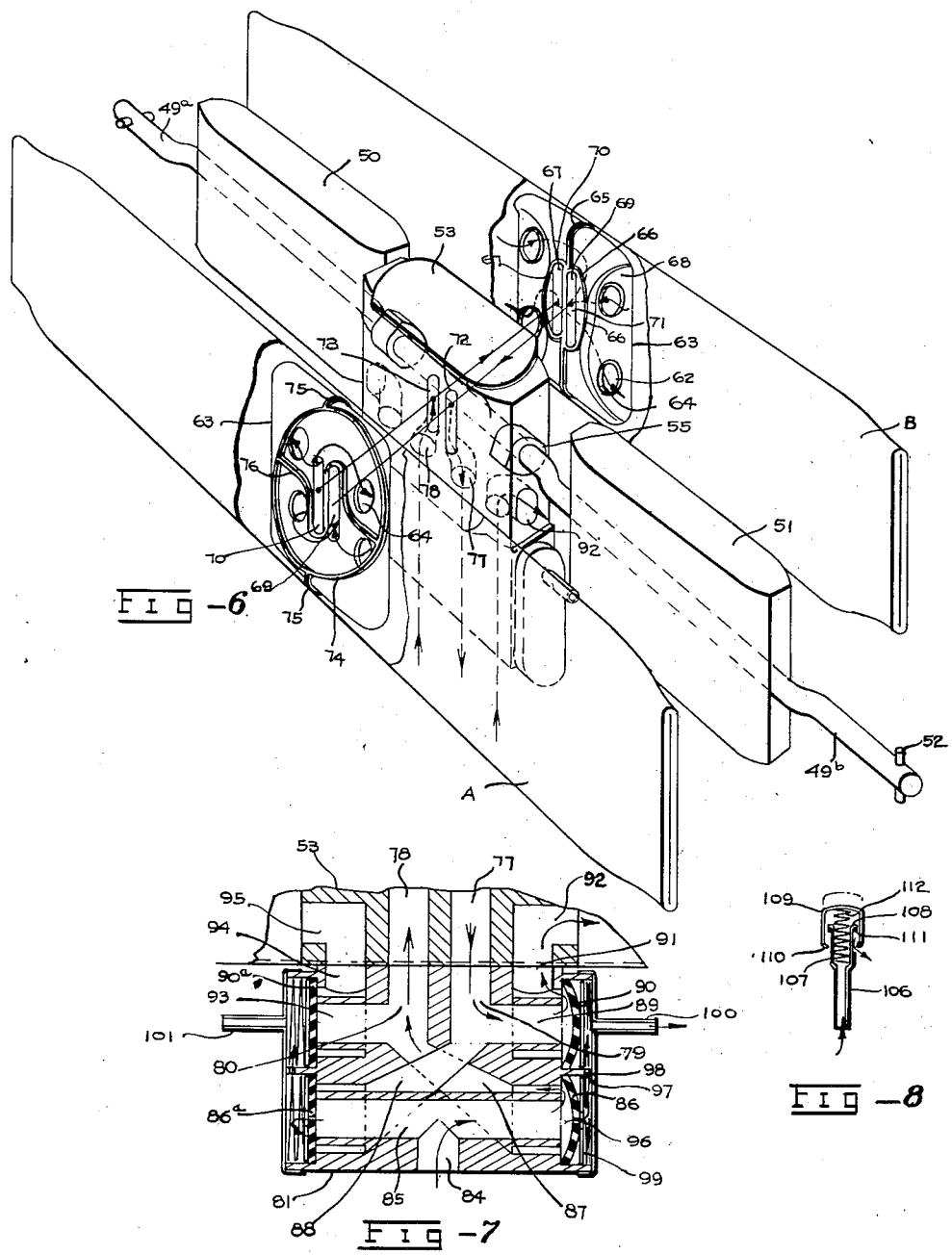

Patented Mar. 8, 1949

2,463,900

UNITED STATES PATENT OFFICE 2,463,900

AIR MOTOR OF THE EXPANSIBLE CHAMBER COLLAPSIBLE WALL TYPE

Stanley W. Nicholson, Toledo, Ohio, assignor to Detroit Harvester Company, Detroit, Mich., a corporation of Michigan Application February 26, 1945, Serial No. 579,741

6 Claims. (Cl. 121—48)

This invention relates to regulator mechanisms for vehicle windows, particularly the windows of automobiles or such vehicles having a well at one side of or below the window opening into and out of which the window panel is movable to uncover or cover the window opening.

An object of the invention is to produce a simple and efficient regulator mechanism for vehicle windows actuated by a fluid motor embodying a crank shaft against which expansible fluid chambers are recurrently operable.

Another object is to produce an air motor adapted for use in actuating a window panel and which includes a plurality of flexible walled cells operable successively to impart rotary motion to a driving shaft.

A further object is to produce an air motor for operating window regulator mechanisms which may be readily and conveniently controlled from a remote station for effecting either opening or closing movement to the window panel.

Other objects and advantages of the invention will hereinafter appear and for purposes of illustration but not of limitation, an embodiment of the invention is shown in the accompanying drawings in which Figure 1 is a side elevation of a vehicle door viewed from the inside with a portion thereof broken away to show the regulator mechanism;

Figure 2 is an enlarged longitudinal sectional view of the air motor;

Figure 2A is an enlarged fragmentary view showing the coupling between the abutting ends of the crank shafts;

Figure 3 is an enlarged transverse sectional view substantially on the line 3—3 of Figure 2;

Figure 4 is an enlarged transverse sectional view substantially on the line 4—4 of Figure 2;

Figure 5 is an enlarged elevation with some of the parts broken away showing the driven member which is operatively connected to the adjacent crank shaft end;

Figure 6 is a diagrammatic exploded perspective of the air motor with the housing removed and some parts omitted;

Figure 7 is a sectional view somewhat diagrammatical of the valve block illustrating by arrows the direction of air travel when one of the control valves is actuated; and Figure 8 is a vertical sectional elevation of one of the control valves.

Figure 1:
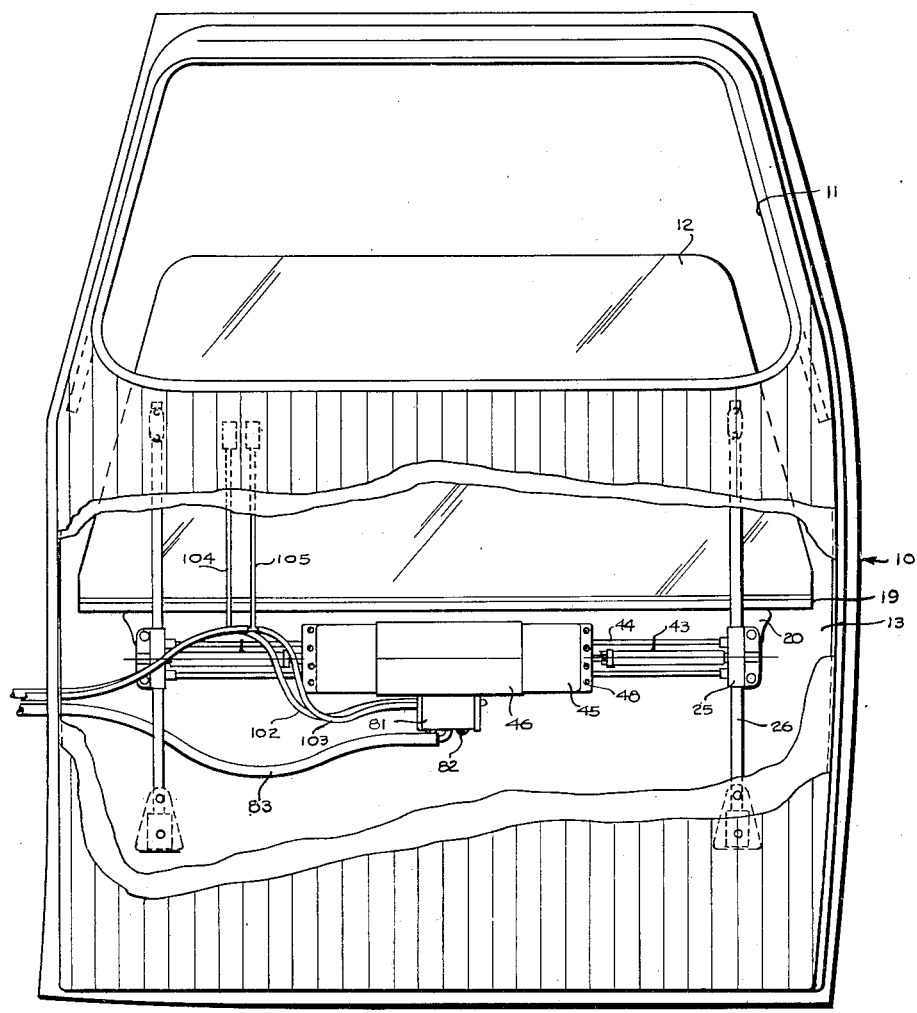

The illustrated embodiment of the invention comprises a vehicle door 10 having a window opening 11, which is adapted to be covered and uncovered by a window glass or panel 12. The window glass is adapted to be lowered into a well 13 formed between the inner and outer panels of the door 10.

In this instance, the window opening 11 has the shape of a trapezium and the window glass or panel 12 is accordingly shaped. This is a particularly difficult structure so far as supporting and guiding of the window glass 12 is concerned, because upon moving the window glass downwardly or toward its open position, the side edges are moved out of engagement with the guide channels so that it is necessary that other means of supporting and guiding the window glass are necessary. It is to be understood that this illustration is of an extreme case in order unmistakably to illustrate the efficaciousness of the supporting and guiding device.

As shown, a channel 19 embraces the lower edge of the window glass 12 and welded to the outer side of the channel 19 adjacent the opposite ends thereof is a pair of depending brackets 20. Bolted to the lower end of each of the brackets 20 is a block through which extends the end of a driven shaft 23. Guides 25 are shaped to receive rack bars 26 and meshing with teeth on the rack bars 26 are pinions 27 which are fixed to the shaft 23 for rotation therewith.

It will be apparent that the window glass 12 is adequately supported and guided in such manner that it can freely move up and down toward and away from its closed position without liability of one or the other side edge portion of the window glass binding or tilting in its guides in any way to interfere with free and uniform window glass movement. The rack bars may be readily and conveniently mounted in position of use in a straight up and down position and since the pinions 27 operate positively to move the window in one direction or the other along the rack bar, straight up and down movement of the window glass is achieved.

Each of the driven shafts 23 carries a pinion 27 and has an enlarged cylindrical portion 37, which has at its opposite end a driving notch 38. Enclosing the enlarged shaft portion 37 is a barrel 39 and intermediate the barrel 39 and shaft portion 37 is a helical coil spring 40. In the form shown on Figure 5, one end of the coil spring 40 is hooked upon a shoulder 41 forming a part of the shaft portion 37 and the opposite end portion of the spring is hooked against the end portion 42 of the barrel. Struck out of the barrel 39 is a tongue 43 which is adapted to be bent to the broken line position shown on Figure 5 to abut against a rod 44, one end of which is secured to the block 22 and the opposite end of which is secured to a block 47 carried by a housing 45 of the air motor as will hereinafter appear.

It will be understood that the anchorage of the spring ends of one side of the air motor housing 45 will be different than on the opposite side but in each case, the arrangement is such that during the downward or opening movement of the window glass 12, the coil spring 40 is wound up or placed under tension so as to assist in the upward or closing movement of the window glass 12. It will further be understood that the stop ear or tongue 43 is bent into the stop position shown by broken lines on Figure 5 when the window is in its uppermost position thereby to hold the barrel 39 in stationary position during the downward or opening movement of the window glass to wind up each spring 40 for placing it under tension.

The housing 45 for the air motor is of sheet metal and in two longitudinal sections with the abutting edges of the sections at the top and bottom of the housing as indicated in Figure 4. Fitting over the central portion of the housing 45 is a pair of U-shaped clamping members 46, the abutting edges of which are at opposite sides of the housing (Figure 4). The free side portions of the U-shaped clamps 46 are sufficiently resilient to grip against the sides of the housing sections 45 to retain them in position.

Arranged inside of the housing 45 is a pair of resilient rubber tubes or cells A and B. The ends of the tubes are open but are clamped together between the reduced ends 45a of the housing 45 and blocks 47 which fit into the opposite ends of the portions 45a. Rivets 48 clamp the parts together and seal the ends of the tubes as will be readily apparent. The oblong blocks 47 are provided with central apertures into which fit sections of a crank shaft 49, which in this instance is formed in two parts 49a and 49b, coupled together as indicated on Figure 2A, by a driving key 49c recessed in each of the shaft parts. Manifestly the crank shaft could be formed in one piece but for convenience in manufacture, a two piece structure is desirable.

As shown, each crank shaft section 49a and 49b is provided with a crank portion and the two cranks are arranged 90 degrees apart. Mounted on the crank of the shaft 49a is an actuating block 50 and mounted on the crank of the shaft 49b is an actuating block 51. The blocks 50 and 51 are elongate flat sided members and are disposed between the rubber tubes or cells A and B and in engagement with the inner sides thereof. As will hereinafter appear, the arrangement is such that air under pressure is introduced to the tubes A and B in such manner as successively to exert a force against one or the other of the actuating blocks 50 and 51 for imparting rotative movement to the crank shaft 49. On the outer end of each of the crank shaft sections 49a and 49b is a pin 52 fitting into the respective notch 38 of the pinion shaft portion 37, thereby to impart rotation to the pinions 27 in the desired direction as will more fully appear hereinafter.

Disposed centrally of the housing 45 is a bearing block 53 suitably apertured to receive the inner end portions of the crank shaft sections 49a and 49b. Adjacent the end portions of the block 53 are enlarged cavities 54 respectively in which are arranged cams 55 secured to the respective crank shaft sections for rotation therewith. Each cam 55 is operatively associated with a pair of vertically spaced balls 56. Each ball 56 is disposed in an aperture which opens respectively into the cavity 54 and a transverse passage 57 in which are slidably mounted a pair of valve stems 58, the inner ends of which have oppositely inclined surfaces 59, which when the stems are in engagement form a V facing the adjacent crank shaft section. Each ball 56 is disposed respectively in the V notch so formed and as the cam 55 revolves, it recurrently forces the balls outwardly thereby causing the adjacent pair of valve stems 58 concomitantly to move outwardly. When the valve stems move inwardly after the cam 55 has passed, the respective ball 56 moves inwardly in the aperture formed in the block 53. For convenience, the upper pair of valves is referred to by the number 58a and the lower pair of valves by the number 58b.

At the outer end of each of the valve stems 58 is a flat head 60, which in its inwardly position fits flush within a recess 61 formed in the block 53. The valve heads 60 abut directly against a portion of the adjacent rubber tube A or B as the case may be and are adapted to flex that portion toward an annular bead 62 formed in a separator or divider 63. As shown there are two dividers 63, one arranged within the tube A and the other arranged within the tube B. In each divider 63 are four holes or ports 64 (Figure 6) and around the inner face of each is an annular bead 62 as above mentioned.

Manifestly when the plungers or stems 58 are forced outwardly through the conjoint action of the respective ball 56 and cam 55, the heads 60 press against the adjacent wall of the respective rubber tube and hold it against the beads 62, thus sealing these holes 64 against flow of air until the cam has passed so that the relieved portion on the opposite side enables the incoming pressure or outgoing pressure upon the rubber tubes to force the plunger stems 58 to move inwardly and force the walls of the tubes to move away from the beads 62, thereby enabling the flow of air therethrough.

Formed on the inner face of each of the dividers 63 is a rib 65 which joins oppositely extending curved ribs 66 and 67. The dividers 63 fit snugly within the respective rubber tubes so that the ribs 65, 66 and 67 pressing the adjacent walls of the tubes against the adjacent face of the block 53, divide each of the tubes into two air cells or expansible chambers, thereby militating against the flow of air from one tube portion to another tube portion and as will hereinafter appear, enabling the two chambers formed in each tube to operate independently. Adjacent the ribs 66 and 67, the metal is cut away as indicated at 68 and in the cut away portion are disposed the pairs of holes 64, thereby facilitating ingress and egress of air from the adjacent tube portions with respect to the holes 64.

On each of the dividers 63 is a pair of vertically disposed slots 69 and 70, which are disposed between the arcuate ribs 66 and 67. On the inner face of each divider and framing each of the holes 69 and 70 is an inwardly extending tubular flange 71, which projects through an aperture formed in the adjacent wall of the respective rubber tube and into correspondingly shaped holes 72 and 73 formed in the block 53. The holes 72 and 73 extend entirely through the block 53 so that the dividers 63 on opposite sides of the block 53 are respectively joined to the block 53 by these tubular flanges 71.

The outer side of each of the dividers 63 is formed with an annular rib 74 and from the outer side of such annulus extend separating ribs 75 at the top and bottom. These ribs cooperate with the adjacent walls of the housing 45 for clamping the respective rubber tube therebetween and for sealing one portion of the tube from the other, thus cooperating in dividing each tube into two chambers as above indicated. The opposite sides of the annular rib 74 are connected by a rib 76, which as indicated on Figure 6, extends from the right hand side inwardly between the adjacent pairs of holes 64, thence upwardly to the upper edge of the elongate slot 69, thence downwardly between the slots 69 and 70, then upwardly to a point substantially midway of the elongate slot 70, and thence to a diametrically opposite point on the annular rib 74. It will be understood that the two dividers 63 are similarly constructed so that the above description applies to each.

The vertically elongate slots 72 and 73 provide air admission and exhaust passages to the tubes and it will be manifest that dependent upon the position of the plunger valves 58, which are positively actuated by the cam 55, air is first admitted to a cell or tube portion on one side and at the same time air in the opposite cell or tube portion is being exhausted. Thus the respective actuating block 50 or 51 is moved in a direction transversely of the housing 45 by the cell or tube portion taking on air under pressure and air in the directly opposite cell or tube portion is being expelled due to the compressing influence of the actuator. This succession of cell inflation and deflation imparts the rotary motion to the crank shaft 49.

As will hereinafter more fully appear, the direction of rotation of the crank shaft 49 depends upon whether air under pressure is admitted to the slot 72 or 73. The slot 73 is in communication with a downwardly extending passage 78, these passages being formed in the block 53 and communicate with passages 79 and 80 respectively in a control block 81. The control block 81 is suitably secured to the under side of the block 53 by screws 82. Air under pressure is supplied to the control block 81 from a tube 83 which communicates with a passage 84 (Figure 7), in the lower portion of the control block 81. The passage 84 communicates with a horizontal passage 85, the ends of which are controlled by disc-like rubber valves 86 and 86a.

When the valve 86 is flexed as indicated on Figure 7, air may pass about the end portion thereof into a passage 87, which leads to the passage 78 and as above described, thence to the elongate slot 73. On the other hand, when the valve 86a is flexed or unseated, air from the horizontal passage 85 may flow into a passage 88, which communicates with the passage 79 so that air may then flow into the passage 77 and into the elongate slot 72. As shown on Figure 7, air is passing from the passage 84 to the horizontal passage 85, past the valve 86 into the passage 87 to the passages 80 and 78 to the vertically elongate slot 73. In such event, air is being exhausted from the elongate slot 72 and that air passes downwardly through the passages 77 and 79 and thence through a branch horizontal passage 89, past a valve 90 into a discharge passage 91 in the block 81, which passage communicates with an L-shaped passage 92 in the block 53. It will be noted that the exhaust air is conducted to the space between a pair of cells and is of advantage in that it assists not only in the deflation of one of the cells but also acts as a cushion or muffler with respect to the expanding cell. This exhaust air finally escapes to the outside through joints in the housing.

On the opposite side of the control block 81 is a branch horizontal passage 93 which communicates with the vertical passage 80 and is controlled by a valve 90a. When the valve 90a is unseated, air may be exhausted into a passage 94, which communicates with an L-shaped passage 95 similar to the passage 92. The valves 90 and 90a are imperforate and are preferably of flexible rubber. The valves 86 and 86a are likewise of flexible rubber but each is provided with a relatively small central aperture 96 and intermediate the adjacent valves, such as the valves 86 and 90, is a partition 97 which has a relatively small bleeder opening 98. Each of the valves has in rear thereof a coil spring 99 which urges the valve to its seat. Normally the valves 86, 86a, 90 and 90a are held seated by air pressure due to the differential surface area, it being manifest that the air upon opposite sides of these valves becomes equalized but the greater pressure area on the outer sides results in these valves being held seated.

Leading from directly in rear of the valves 90 and 90a are tubes 100 and 101 to which are connected flexible tubes 102 and 103 respectively. These tubes may lead to any desired locality and, as will hereinafter appear, have manually operated control valves. Such valves may be positioned in any convenient location and there may be several valves employed for each line, one being located for example adjacent the driver's seat and another in the rear door, in case the window of that door is to be controlled. This enables either the occupant of the rear seat or the driver to actuate the window panel of that door.

As indicated in Figure 1, branch tubes 104 and 105 extend vertically from the tubes 102 and 103 respectively and at the upper end of each of the tubes 104 and 105 is a valve, such as indicated on Figure 8, which consists of a tubular portion 106 which has an outwardly flared upper end portion 107 terminating in an outwardly turned flange 108. Fitting over the end of the outwardly flared portion is a cap 109, which has an inturned flange 110 adapted to seat against a gasket 111 on the under side of the flange 108. A coil spring 112 urges the cap 109 outwardly into the broken line position and in such outward position the flow of air from the tube is sealed. However, by depressing the cap 109 to move the flange 110 away from the gasket 111, air is allowed to escape from the inside thereof.

Assuming that the valve device above described is in the line leading from the tube 100 (Figure 7) then it will be manifest that the pressure is relieved on the right hand side of both the valves 86 and 90 so that the air pressure from the passages 84 and 85 bows the valves 86 outwardly and cylinder pressure bows valve 90 outwardly as indicated thereby allowing air to pass through the passages above described to the vertically elongate slot 73 and thereby to exhaust from the vertically elongate slot 72. The air will flow in this manner so long as the valve cap 112 is maintained in its depressed position. It will be manifest that this enables the air under pressure to pass to the passage 78 and elongate slot 73 and into the tube A. Due to the rib structure in the divider the air from the elongate slot 73 is caused to flow to the upper hole 64 in the divider in the tube A and to a lower hole in the opposite divider in the tube B but since the plunger valves 58b are in a closed position, the flow of air to the tube B is shut off. The two associated plunger valves 58a are at the open position and air is free to pass from the elongate slot 73 through the slot 70 to the upper hole 64 in the tube A. Coincidentally exhaust air is free to pass through the upper hole in the divider in tube B and communicate with the exhaust slot 72. Manifestly the operations of the plunger valves are so timed that air is delivered and exhausted successively from the several tubes in the proper manner to impart rotary motion to the crank shaft 49.

An inspection of Figure 2 will indicate this succession of operations. In the cell C the pressure is being built up to force the actuator 50 to the right. At the same time, air is being exhausted from the cell C¹ which is directly opposite to the cell C. The cell C² has completed its pressure phase and is just about ready to exhaust, whereas the cell C³ has completed its exhausting and will shortly admit air to impart movement in the opposite direction to the adjacent actuator 51. It will be apparent that this action is somewhat similar to a four cylinder gasoline engine in which the pistons operate in timed relation to impart rotative movement to the crank shaft.

When it is desired to impart rotation to the crank shaft in the opposite direction, the valve associated with the tube 100 (Figure 7) is closed whereupon the valves 86 and 90 snap to closed position. Then, by operating a similar valve associated with the tube 101, the valves 90a and 86a are abruptly arched to their unseated or open position and in that event, the elongate slot 73 functions as an exhaust and the slot 72 functions as the air intake or power slot. This reverses the direction of air currents and the cycle of operation so that the crank shaft is rotated in the opposite direction.

It is to be understood that numerous changes in details of construction, arrangement and operation may be effected without departing from the spirit of the invention especially as defined in the appended claims.

What I claim is:

1. An air motor comprising a longitudinally elongate housing, a crank shaft within said housing having a plurality of crank portions offset relatively to each other, an actuator block on each crank portion and adapted for to and fro movement transversely of the housing for imparting rotation to the crank shaft, a pair of air cells for each actuator block arranged on opposite sides thereof and each cell having a flexible wall engaging the respective block, said air cells comprising a pair of elongate resilient rubber tubes, means closing the opposite ends of said tubes, means disposed intermediate the ends for dividing each tube into two cells, said dividing means including air admission and exhaust ports and passages for the cells respectively, and means for distributing pressure fluid successively to and exhausting same from said cells for actuating said actuator blocks.

2. An air motor comprising a longitudinally elongate housing, a crank shaft extending lengthwise of the housing and having a plurality of crank portions offset relatively to each other, an actuator block on each crank portion for reciprocating movement transversely of the housing, flexible tube means for opposite sides of each actuator, means intermediate the ends of each tube for dividing same into two cells, said dividing means providing air inlet and outlet means, and means for introducing air under pressure to each of said dividing means.

3. An air motor comprising a longitudinally elongate housing, a crank shaft extending lengthwise of the housing and having a plurality of crank portions offset relatively to each other, an actuator block on each crank portion for reciprocating movement transversely of the housing, flexible tube means for opposite sides of each actuator, means intermediate the ends of each tube for dividing same into two cells, said dividing means providing air inlet and outlet means, means for introducing air under pressure to each of said dividing means, and control means for successively and recurrently causing air to pass to said air cells in a predetermined manner, said control means including valves and means on said crank shaft for actuating said valves.

4. An air motor as claimed in claim 3 in which said tube dividing means comprises a separator member disposed within each tube, each separator member having means abutting against the adjacent tube walls to provide a sealing engagement and also to provide ports and passages for pressure fluid, certain of said ports being recurrently sealed by operation of said valves pressing the adjacent tube wall thereagainst.

5. An air motor as claimed in claim 3 in which said dividing means comprises an air distributing block arranged between said actuator blocks and through which said crank shaft extends, a separator member disposed within each tube adjacent said distributing block, said distributing block having inlet and exhaust passages terminating in lateral ports for each separator member, each separator member having means holding the adjacent tube walls against the distributing block and providing ports and passages for pressure fluid, and said tubes having openings to enable communication between ports in said distributor block and adjacent separator members.

6. An air motor as claimed in claim 3 in which said control means includes a control block provided with a single inlet port for fluid under pressure, a pair of inlet-exhaust ports, and passages leading from said inlet-exhaust ports to said inlet port, and a pair of valves associated with each of said passages, means enabling pressure fluid to bleed past certain of said valves, a normally closed control valve associated with each pair of valves and to which pressure fluid is bled whereby opening of one or the other control valve enables admission of pressure fluid to one or the other of said inlet-exhaust ports.

STANLEY W. NICHOLSON.

REFERENCES CITED

The following references are of record in the file of this patent:

UNITED STATES PATENTS

| Number | Name | Date |
|---|---|---|
| 1,267,535 | Freborg | May 28, 1918 |
| 1,680,089 | Crofton | Aug. 7, 1928 |
| 1,727,935 | Olsen | Sept. 10, 1929 |
| 2,086,251 | Winchell | July 6, 1937 |
| 2,218,719 | Richards | Oct. 22, 1940 |
| 2,236,450 | Roethel | Mar. 25, 1941 |
| 2,336,530 | Chandler | Dec. 14, 1943 |
| 2,372,813 | Darling | April 3, 1945 |

FOREIGN PATENTS

| Number | Country | Date |
|---|---|---|
| 16,407 | Great Britain | July 17, 1911 |
| 454,660 | Germany | Jan. 14, 1928 |